US010424028B2

(12) United States Patent
Bender et al.

(10) Patent No.: US 10,424,028 B2
(45) Date of Patent: Sep. 24, 2019

(54) SMART SENSOR-BASED CONSUMER SERVICE OPTIMIZATION

(71) Applicant: International Business Machines Corporation, Armonk, NY (US)

(72) Inventors: Michael Bender, Rye Brook, NY (US); Rhonda L. Childress, Austin, TX (US); Michael P. Shute, Niantic, CT (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 15/402,006

(22) Filed: Jan. 9, 2017

(65) Prior Publication Data

US 2018/0197257 A1   Jul. 12, 2018

(51) Int. Cl.
*G06Q 50/12* (2012.01)
*G06Q 30/06* (2012.01)
(Continued)

(52) U.S. Cl.
CPC ......... *G06Q 50/12* (2013.01); *G06Q 20/3224* (2013.01); *G06Q 30/0611* (2013.01);
(Continued)

(58) Field of Classification Search
CPC ............... G06Q 50/12; G06Q 20/3224; G06Q 30/0611; G06Q 30/0633; G06Q 30/0635; G06Q 30/0641
(Continued)

(56) References Cited

U.S. PATENT DOCUMENTS

2008/0004996 A1   1/2008   Kuehling
2015/0371317 A1   12/2015   Bosko et al.
(Continued)

OTHER PUBLICATIONS

Anotny, Richard Norwood. Data Fusion Support to Activity-Based Intelligence. Oct. 1, 2015. Artech House.*
(Continued)

*Primary Examiner* — Nathan C Uber
*Assistant Examiner* — Fawaad Haider
(74) *Attorney, Agent, or Firm* — Heslin Rothenberg Farley & Mesiti P.C.; Michael Petrocelli, Esq.

(57) ABSTRACT

A method, computer program product, and system includes a processor(s) determining, based on obtaining data from the one or more sensors over the wireless communications connection, that individuals are within a given vicinity. The processor(s) queries personal computing devices associated with the individuals to determine an identity of each individual in the given vicinity. The processor(s) assigns a service provider(s) to a portion of the identified individuals. The processor(s) obtains preference information related to the portion and determines environmental information related to an environment experienced by the portion by locating at least one sensor within a predetermined distance of the portion, and communicating, over the wireless communications connection, with the at least one sensor. The processor(s) generate simulations for providing services to the portion that include temporal parameters and selects an optimal simulation. The processor(s) communicates instructions to achieve aspects of the optimal simulation to the service provider(s).

9 Claims, 6 Drawing Sheets

(51) Int. Cl.
*G06Q 20/32* (2012.01)
*H04W 84/18* (2009.01)
(52) U.S. Cl.
CPC ..... *G06Q 30/0633* (2013.01); *G06Q 30/0635* (2013.01); *G06Q 30/0641* (2013.01); *H04W 84/18* (2013.01)
(58) Field of Classification Search
USPC .......................................................... 705/15
See application file for complete search history.

(56) References Cited

U.S. PATENT DOCUMENTS

2016/0048709 A1 2/2016 Butler et al.
2016/0180679 A1 6/2016 Cowley et al.

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

\* cited by examiner

SMART SENSOR-BASED CONSUMER SERVICE OPTIMIZATION

BACKGROUND

In a services industries, such as food service venues, it is difficult to personally assess when to interact with a consumer to optimize the customer's satisfaction and to optimize the ability of the service provider to earn maximum revenue. While some customers are responsive to frequent visits from a server, other patrons are annoyed by what they perceive to be constant intrusions. The preferences of these individuals may vary based on temporal factors and atmospheric conditions.

SUMMARY

Shortcomings of the prior art are overcome and additional advantages are provided through the provision of a method for optimizing service to a consumer by a service provider. The method includes, for instance: determining, by one or more processors, based on obtaining data from one or more sensors over a wireless communications connection, that individuals are within a given vicinity; querying, by one or more processors, via the wireless communications connection, personal computing devices associated with the individuals within the given vicinity to determine an identity of each individual in the given vicinity; assigning, by the one or more processors, one or more service providers to a portion of the identified individuals; obtaining, by the one or more processors, from computing resources accessible over the wireless communications connection, wherein the computing resources comprise the personal computing devices, preference information related to the portion of the identified individuals; determining, by the one or more processors, environmental information related to an environment experienced by the portion of the identified individuals, wherein the determining comprises locating at least one sensor of the one or more sensors, wherein the at least one sensor is within a predetermined distance of the portion of the identified individuals, and communicating, over the wireless communications connection, with the at least one sensor; based on the preference information and the environmental information, generating, by the one or more processors, simulations for providing services to the portion of the identified individuals, wherein the simulations comprise temporal parameters for providing the services; selecting, by the one or more processors, an optimal simulation; and communicating, by the one or more processors, via the wireless communications connection, instructions to achieve aspects of the optimal simulation to the one or more service providers, wherein the communicating comprises populating the instructions on one or more graphical user interfaces of one or more mobile computing devices of the one or more service providers, based on the temporal parameters.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
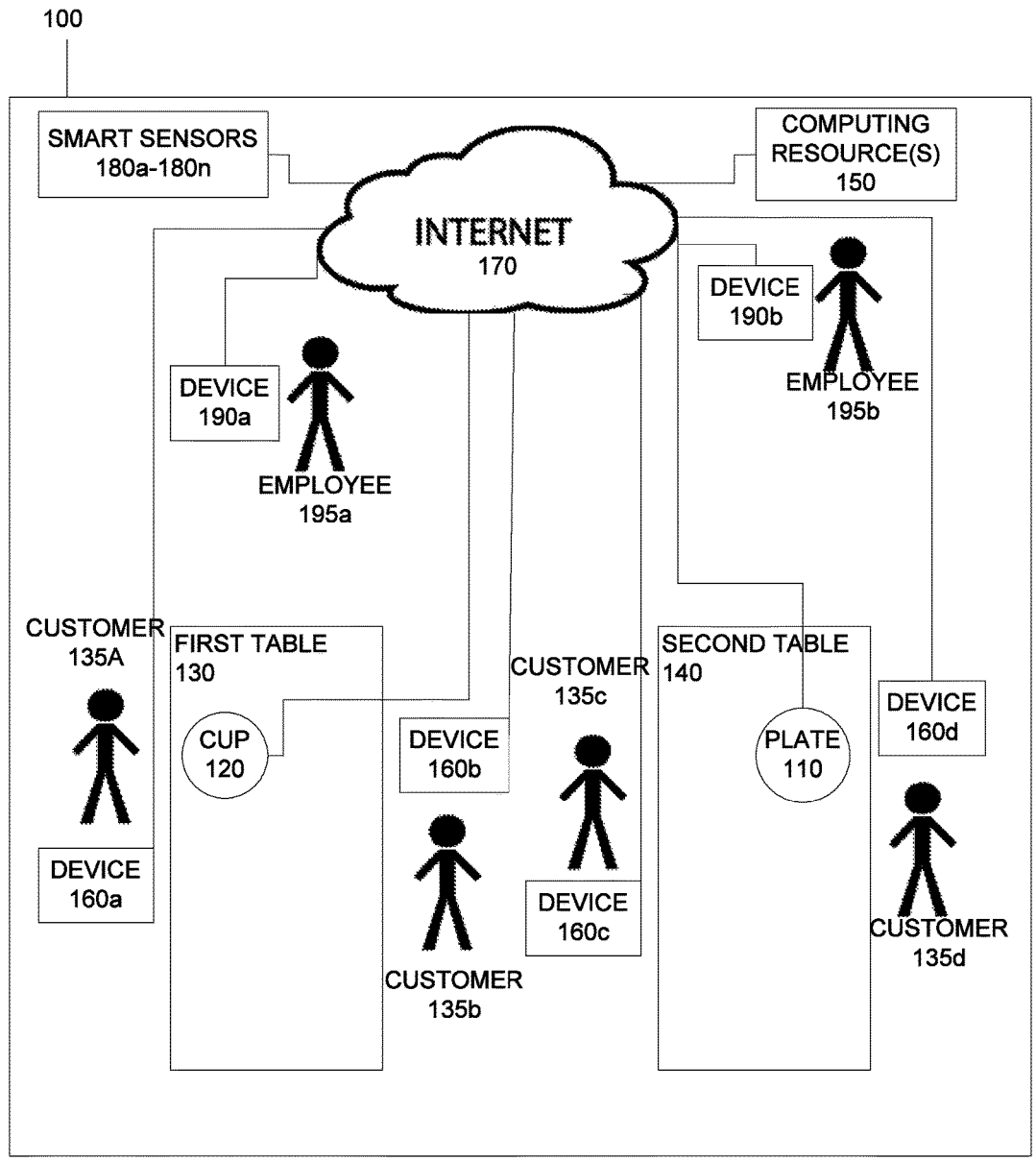
FIG. 1 is a physical environment illustrating certain aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
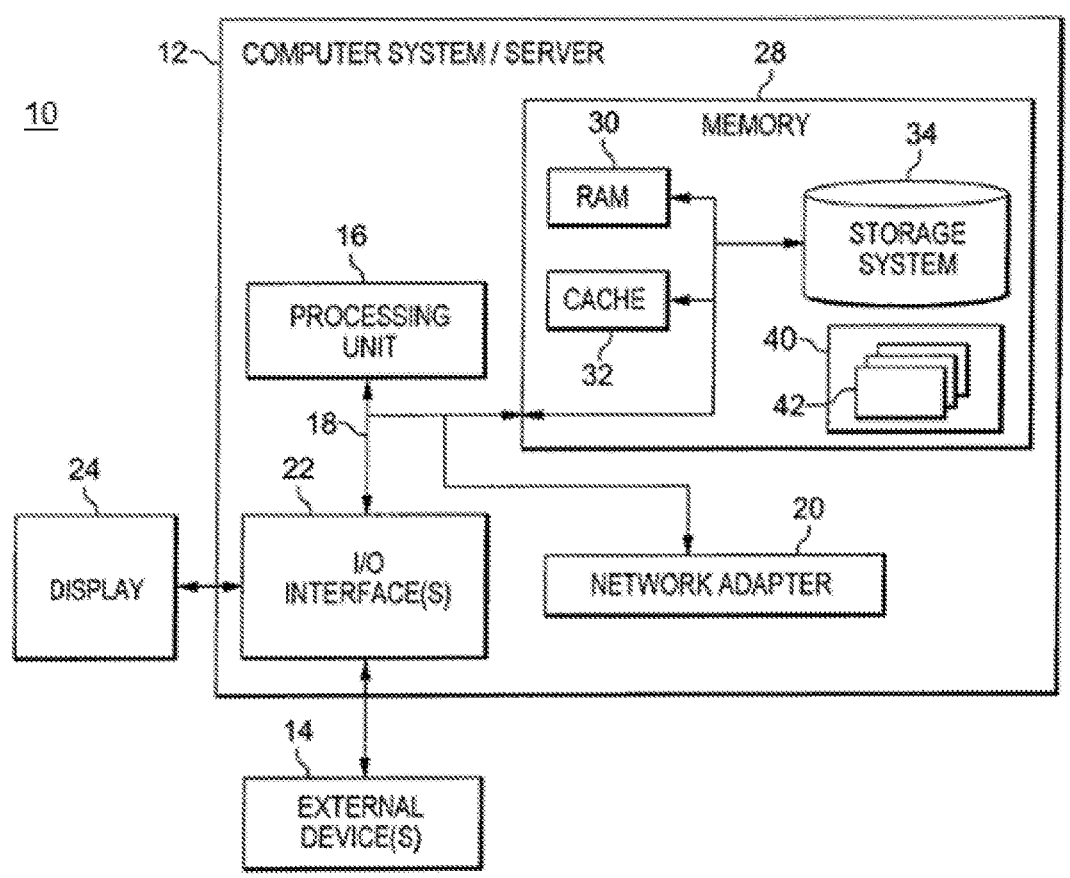
FIG. 4 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

As discussed above, a service provider's ability to service a customer in an efficient manner is limited to the personal abilities of the service provider to anticipate the needs of the customer. This approach will not produce predictable results in a timely manner and therefore cannot be utilized to create an efficient customer service model for each customer. In the absence of being able to anticipate (predictably) the needs of a customer, a service provider may simply stick to a generic routine in the hopes that a one-size-fits-all approach will offend the fewest customers. This blanket solution is also unlikely to be the most efficient approach given that the individual preferences and needs of customers will be sacrificed in creating this conformity. Embodiments of the present invention utilize aspects of Internet of Things (IoT) and smart sensors within this network to develop and implement a more efficient approach for utilization by service providers to anticipate customer needs, address the anticipated needs, and benefit personally (e.g., financially) from these process improvements.

As understood by one of skill in the art, the IoT is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to the object, including but not limited to, temperature and humidity. The smart sensors can be utilized to measure temperature, humidity, vibrations, motion, light, pressure and/or altitude. Because the smart sensors carry unique identifiers, a computing system that communicates with a given sensor can identify where the source of the information.

Embodiments of the present invention are directed to implementing certain improvements to technologies considered part of the IoT, in order to provide a solution to fulfilling customer service needs in a predictably efficient manner. This solution is enabled specifically by the utilization of the technology, including but not limited to, smart sensors, personal computing devices, and connectivity and communication of these objects over a wireless communication connection, including but not limited to, the Internet. In one aspect of an embodiment of the present invention, one or more programs receive sensor data from various identifiable objects and utilize the data to determine the needs of a given consumer and to anticipate those needs. For example, in a given service setting, including but not limited to, a restaurant setting, embodiments of the present invention include one or more programs that utilize sensor data to determine if a customer is in need of an additional service. The one or more programs may make this determination based on receiving data that includes information regarding the past consumption habits of the customer, the customer's preferences for interactions with service providers, and/or data related to previous interactions of the customer with a service provider, under both similar and/or disparate conditions. In an embodiment of the present invention, one or more programs analyze the interactions of a given service provider with the customers s/he is serving and provide the server with a recommended route to optimize the server's productivity. An advantage of aspects of embodiments of the present invention is that it provides a method, computer program product, and system for extending functionality in the IoT to optimize customer service. This advantage is inextricably tied to computing at least because this aspect improves the efficiency of customer service by implementing specific computing nodes to facilitate and optimize customer interactions in a given environment. By utilizing data collected by customized and strategically placed sensors, as well as communications between computing devices over a communications network, such as the Internet, embodiments of the present invention enable process efficiencies that were formerly not possible. Thus, embodiments of the present invention use of IoT sensors to gather data, predict customers' desired interactions, and/or prioritize workload to manage resources and improve customer satisfaction.

FIG. 1 is an example of a physical environment 100 into which aspects of an embodiment of the present invention can be implemented. This physical environment 100, which is a restaurant, is utilized merely as an illustrative example and is not meant to suggest any limitation to the implementation of aspects of the present invention in various service provider environments. As seen in FIG. 1, an embodiment of the present invention implemented in the physical environment 100 includes a sensor embedded in a plate 110 and a sensor embedded in a cup 120. Although only one of each of these sensors in shown, an unlimited amount of such sensors can be implemented in a physical environment 100.

In this example, a server previously delivered the cup 120 containing a beverage to a customer at a first table 130. A server previously delivered the plate 110 with an appetizer on it that was ordered by a customer at the second table 140. One or more computing node (e.g., FIG. 4, 10) communicates with the sensors in the cup 120 and the plate 110. These nodes include at least one computing resource 150 utilized by the establishment, for example, as part of a point-of-sale system. These nodes also include personal computing devices 160a-160b associated with individuals 135a-135b at the first table 130 and personal computing devices 160c-160d, associated with individuals 145a-145b at the second table 140. The employees 195a-195b (e.g., servers) utilize mobile computing devices 190a-190b. The various computing nodes and the sensors communicate with each other over a network, including but not limited to, the Internet 170. The physical environment 100 may also include smart sensors 180a-180n, which can be utilized to collect environmental information, including but not limited to temperature, humidity, vibrations, motion, light, pressure and/or altitude. In FIG. 1, the smart sensors 180a-180n are grouped together for ease of understanding. However, they may be randomly and/or strategically distributed around the physical environment 100. While only one employee is assigned to a single table in FIG. 1 for ease of understanding, as is apparent to one skilled in the art, multiple employees can be assigned different tasks for a single customer.

Figure 2:
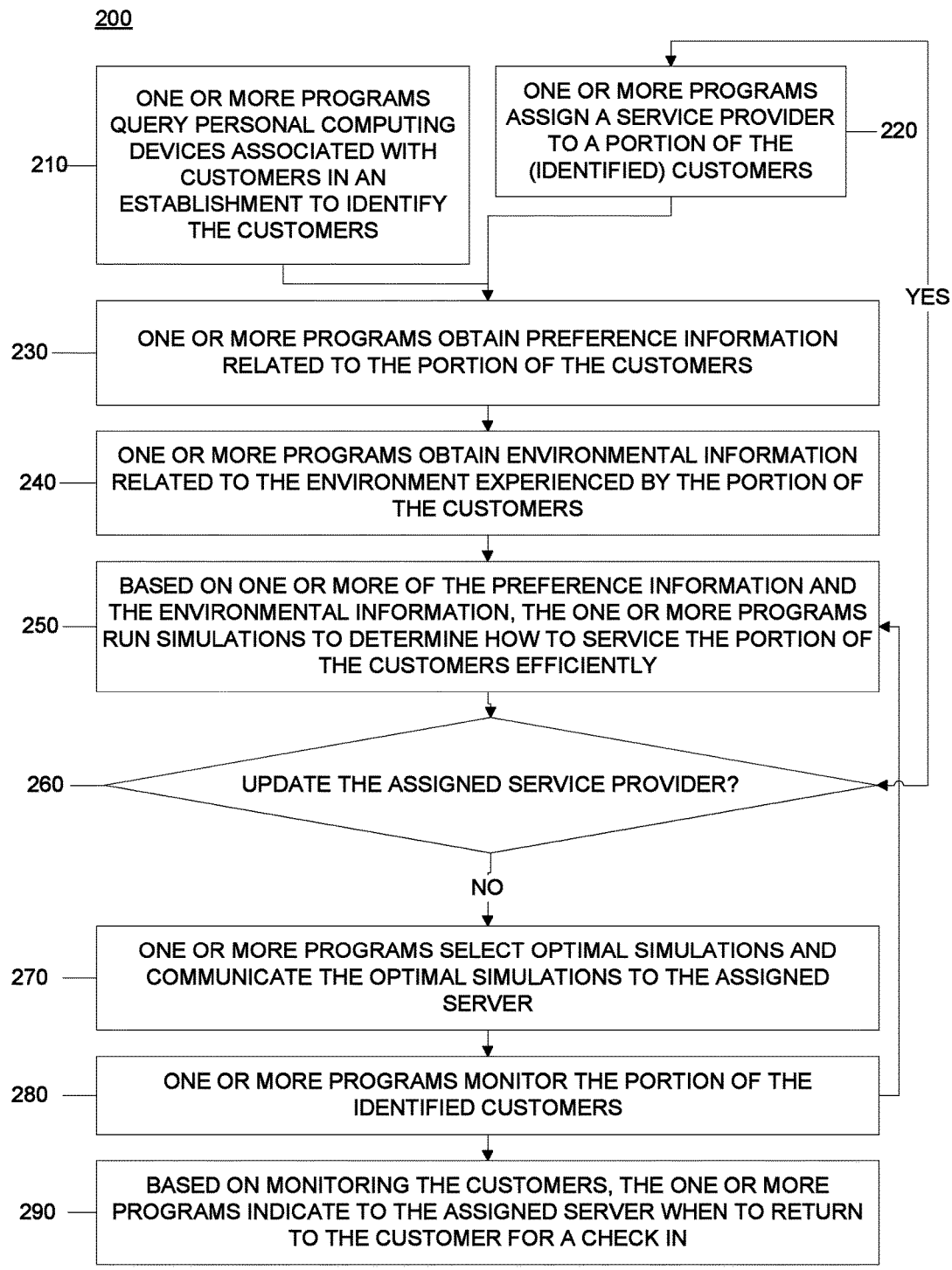
FIG. 2 is a workflow illustrating certain aspects of an embodiment of the present invention.

FIG. 2 is an example of a workflow 200 of aspects of an embodiment of the present invention. For ease of understanding, the workflow 200 references physical elements in the physical environment 100 of FIG. 1. FIG. 2 also includes some aspects that are specific to a food service (e.g., restaurant) environments for the purpose of illustrating certain aspects of embodiments of the present invention. The examples tied to a restaurant environment are meant merely to illustrate certain advantages of embodiments of the present invention in this setting, not to suggest any environmental limits to implementations.

In an embodiment of the present invention, one or more programs executed by at least one processing circuit of the at least one computing resource 150 (FIG. 1) utilized by the establishment query the personal computing devices 160a-160d associated with customers in the establishment to identify the customers (210). In an embodiment of the present invention the one or more programs assign a service provider (e.g., a server) to a portion of the identified customers (220). For example, in a restaurant setting, the one or more programs may assign a given server to customers seated at a specific table. The one or more programs may perform the identification and service provider assignment consecutively or concurrently.

In an embodiment of the present invention, the one or more programs obtain preference information related to the portion of the customers (230). The preferences may include, but are not limited to, historical preferences of the customers. The one or more programs may obtain historical data related to the customers from the personal computing devices 160a-160d, the computing resource 150 (e.g., for a customer who has visited the establishment previously), and from various other sources accessible over a communications connection. The one or more programs obtain environmental information, for example, from sensors 180a-180n, related to the environment experienced by the portion of the customers (240). The environmental information may include, but is not limited to, the weather conditions in the environment 100 (FIG. 1) and information regarding the movement of the staff working in the environment 100 (FIG.

1), the latter of which the one or more programs can utilize to determine the speed of the staff and/or how busy the staff members are.

In an embodiment of the present invention, based on one or more of the preference information and/or the environmental information, the one or more programs run simulations to determine how to service the portion of the customers efficiently (250). The one or more programs utilize one or more of the preferences and the environmental information as parameters in these simulations. Based on the simulations, the one or more programs determine whether to update the assigned service provider (260). For example, in an embodiment of the present invention, the one or more programs may determine, based on historical data, that a given customer spends a shorter than average amount of time at food service establishments similar to the given establishment and based on this determination, assigns a server who moves more quickly than the originally assigned server to the customer. Conversely, if the one or more programs determine that a given customer prefers to linger, the one or more program may assign a server who is already busy with other customers as this additional customer will not be very demanding and the server will be able to maximize his or her tips by adding this additional customer and the level of service available to the customer will be satisfactory to the customer.

The one or more programs select optimal simulations and communicate the optimal simulations to the assigned server (270). In an embodiment of the present invention, the one or more programs may notify the servers of the optimal simulations over a communications connections such that the servers may instantly receive this time-sensitive information on mobile computing devices 190a-190b (FIG. 1).

In an embodiment of the present invention, the one or more programs monitor the portion of the identified customers (280). The one or more programs may utilize the 180a-180n and the computing devices 160a-160d to monitor the customers and update preferences based on the monitoring. The one or more programs may also utilize the embedded sensors, such as the cup 120 and the plate 110 to determine if a given customer has completed a course. For example, the server may have placed the plate 110 and/or the cup 120 at a table and the sensors embedded in these items may indicate (actively, or after being polled) that they are empty and therefore, a course is complete. Based on monitoring the customers, the one or more programs indicate to the assigned server when to return to the customer for a check in (290).

Because the one or more programs continually monitor the customers, the one or more programs can continue to optimize a customer's experience up until the customer leaves the establishment, ending the experience. Thus, throughout the stays of customers, the one or more programs run simulations to determine how to efficiently service the customers (250). Based on the simulations, the one or more programs may update the assigned service provider (260). And the one or more programs select optimal simulations and communicate the optimal simulations to the assigned server (270).

Figure 3:
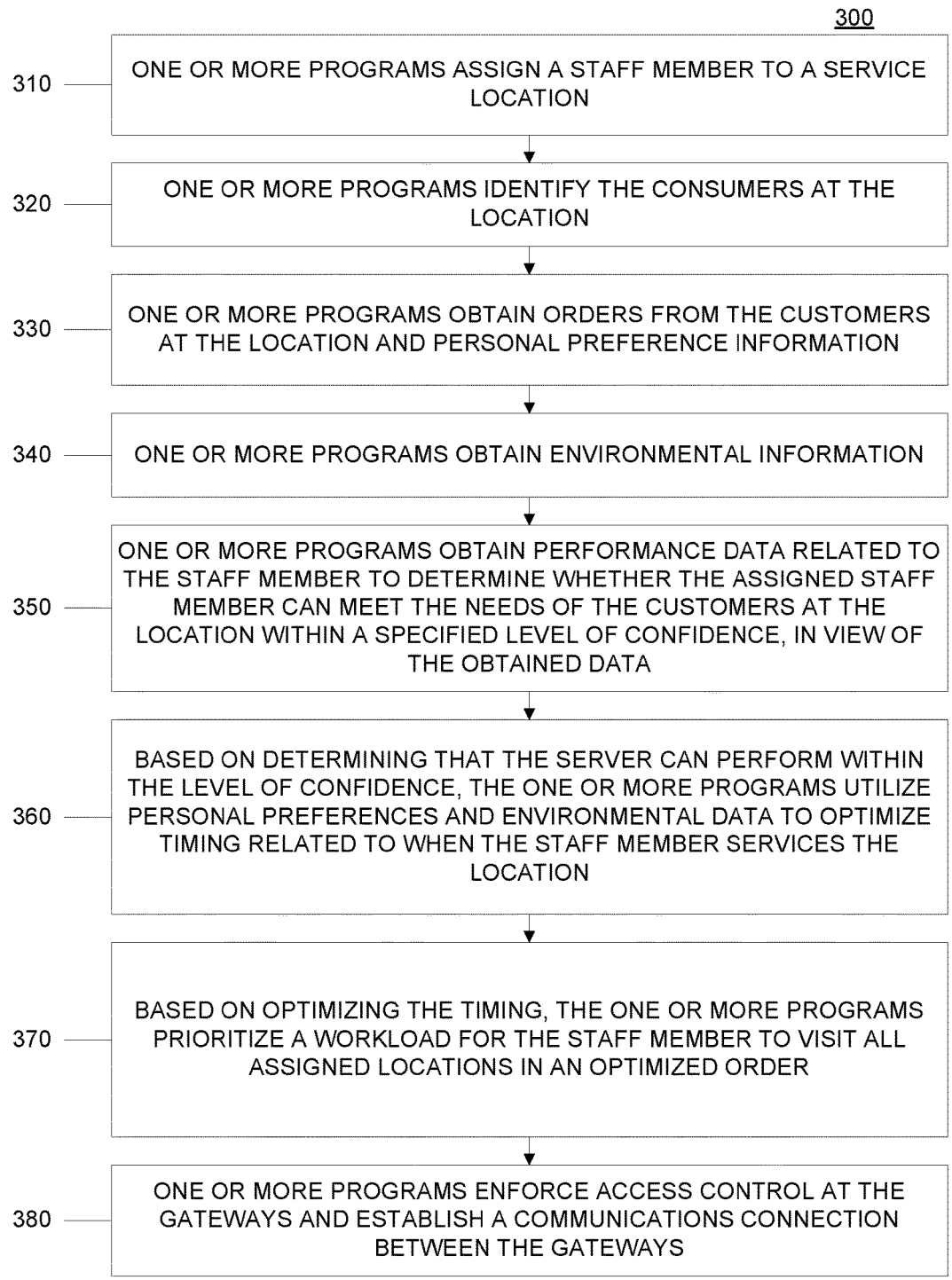
FIG. 3 is a workflow illustrating certain aspects of an embodiment of the present invention.

FIG. 3 is a workflow 300 of an embodiment of the present invention. For ease of understanding, this workflow 300 is also illustrated with elements from the physical environment 100 of FIG. 1. In an embodiment of the present invention, one or more programs (e.g., executed on at least one computing resource 150 (FIG. 1)), assign a staff member to a service location (310). The service location could be a table, such as a first table 130 (FIG. 1), if the physical environment is a restaurant. In an embodiment of the present invention, the one or more programs identify the consumers at the location (320). The one or more programs may identify these consumers by communicating with the computing devices 160a-160d (FIG. 1) associated with individuals or based on a sensor within the vicinity of the individual, such as an RFID. The one or more programs may also identify these individuals based on the individuals having swiped a loyalty card on a reader communicatively connected to the at least one computing resource 150 (FIG. 1). In an embodiment of the present information, the staff member may solicit identifying information from the customers at the location. For example, the staff member may request and then swipe the loyalty card utilizing a mobile computing device 190a-190b (FIG. 1).

In an embodiment of the present invention, one or more programs obtain orders from the customers at the location and personal preference information (330). Additionally, the one or more programs obtain environmental information (340). For example, the one or more programs may not only capture food/drink orders, for example, via a communications connection to a mobile computing device 190a-190b, but the one or more programs may access smart sensors 180a-180n (FIG. 1) in the vicinity of the location to capture data including, but not limited to, current time and current weather conditions.

Returning to FIG. 3, in an embodiment of the present invention, the one or more programs obtain performance data related to the staff member to determine whether the assigned staff member can meet the needs of the customers at the location within a specified level of confidence, in view of the captured data (orders and/or environmental conditions) (350). In an embodiment of the present invention, the one or more programs may apply a machine learning algorithm in order to generate patterns related to the service levels of a given server. Based on determining that the server can perform within the level of confidence, the one or more programs utilize personal preferences and environmental data to optimize timing related to when the staff member services the location (360). Thus, the program code optimizes the time a given server will spend at a given location. In an embodiment of the present invention, included in the environmental data is sensor data from sensors at the location, including but not limited to sensors embedded in plates and cups (e.g., plate 110, cup 120, FIG. 1), to alert the staff member to when the location needs additional servicing. For example, in an embodiment of the present invention, data from plate 110 and cups 120 utilized as service items alert staff members to when drinks need to be refilled, plates need to be cleaned, and/or plates need to be refilled (e.g., when a table need more bread). The one or more programs also utilize information capture that is not driven a customer, for example, that ordered items are ready to serve, when informing a server that it is time to serve customers at the location. In an embodiment of the present invention, the staff can receives updates and alerts that direct the staff member to follow the optimized timing from the one of more programs via mobile computing devices 190a-190b.

In an embodiment of the present invention, a staff member can enter information about a customer observed during service to inform the machine learning algorithms utilized to optimize the service experiences. The updating of the algorithms enables the ability of the one or more programs to continually improve in their ability to optimize service experiences for both customers and service providers.

As demonstrated in FIG. 3, in an embodiment of the present invention, the one or more programs utilizes a combination of preferences, environmental factors, and order information (e.g., the details of the order and when the order is ready). Based on optimizing the timing, the one or more programs prioritize a workload for the staff member to visit all assigned locations in an optimized order (370).

Embodiments of the present invention provide various advantages to service industries in a variety of different environments. Below are examples of certain situations in which both consumers and service providers benefit from utilizing aspects of embodiments of the present invention.

In one example, when a family is out to dinner, as soon as their plates are empty from completing the main course, the family will either have dessert or choose to pay the bill. A family that is attended to more quickly upon completing the main course may be more likely to order dessert. In an embodiment of the present invention, one or more programs communicate with a sensor such as the plate 110 (FIG. 1) to determine when the family has stopped eating. One or more programs executing on one or more computing resource(s) 150 (FIG. 1) obtain this information by polling a passive sensor in the plate 110 (FIG. 1) at regular intervals and/or an active sensor in the plate 110 (FIG. 1) may notify the one or more programs that the family has completed eating. In an embodiment of the present invention, the sensor is a motion sensor and/or a pressure sensor that determines when food on the plate had been removed. Based on determining that the family is no longer eating, the one or more programs notify an assistant to clear the plates, and the waiter comes by and asks if they would like dessert. This notification and the suggestion to ask if the family wants dessert can be understood as optimal simulations that the one or more programs select and communicate to the assigned server (e.g., FIG. 2, 270). By efficiently servicing this family in a timely manner, the probability of the family ordering dessert increases, which creates customer satisfaction and optimizes the turnover rate for the restaurant.

In another example, a couple may be sharing a romantic dinner and is not in a rush to leave, but are also not heavy drinkers. Based on the historical preferences of the couple, the program code determines that when their glasses are empty, they like a refill offered about fifteen (15) minutes later. Provided that these refills are offered in a timely manner, the couple will continue to order drinks. Otherwise, they will remain at the table without ordering additional beverages. The one or more programs determine that a server should visit the couple no more than fifteen minutes after finishing their drinks and notify the assigned server as to when s/he should visit. This notification and the suggestion can be understood as optimal simulations that the one or more programs select and communicate to the assigned server (e.g., FIG. 2, 270). In an embodiment of the present invention, the one or more programs may also automatically place additional drink orders for the couple based on historical preferences. To determine when a drink is finished, a drink may be served in a cup 120 (FIG. 1) with an embedded sensor that can communicate with the one or more programs over a communications connection, such as the Internet.

Embodiments of the present invention may also accommodate a group of friends out for drinks. In this example, the one or more programs determined that as one of the friend's glasses is down to ¼ full, the friend will order another round. This continues for about three (3) hours, when the friends start slowing down. Based on this historical information, the one or more programs notify the assigned server of the appropriate time for the server to refill the drinks.

In an embodiment of the present invention, the program code may identify the consumers based on personal sensors, rather than computing devices, or in addition to computing devices. For example, in an environment such as a hotel or a cruise ship, each individual may carry a personal sensor, such as an RFID, as a key card. One or more programs can utilize these sensors to identify the individuals. For example, a waitress on a cruise ship has a very large deck to cover for drinks. Based on the mix of customers, the one or more programs can recommend which customers are most likely to order a drink, using historical weather and drinking patterns based on the time of day. The one or more programs identify the customers by their RFID enabled room keys. As the one or more programs determines that the customers are a mix of people who want quick service and some who are casually enjoying the environment, the one or more programs determine an optimal path along the deck for the server to approach passengers.

As aforementioned, embodiments of the present invention utilize environmental information, obtained by the one or more programs from smart sensors 180a-180n (e.g., FIG. 1), to determine when to serve a given customer. For example, a member of a country club may have a habit of never ordering beverages on hot days, but is prone to ordering them on cold mornings. Based on obtaining information from a smart sensors 180a-180n (FIG. 1), that the time is in the afternoon and the temperature is cool enough, the one or more programs may indicate to a server to approach the customer to offer a warm beverage.

As discussed above, embodiments of the present invention take into account preferences of individuals when optimizing the tasks of a service provider. Thus, aspects of an embodiment of the present invention can address the situation where a person has remotely checked into a hotel via his smartphone and needs to get a key to a room. When the person arrives, the receptionist may be otherwise engages with another guest. Based on the preferences associated with the individual, which the one or more programs access from the smartphone or historical information available on another computing resource, including one or more IoT sensor, the one or more programs determine that the individual will grow frustrated with waiting after two minutes have elapsed. Because the one or more programs access an environmental sensor and determine when the individual entered the establishment, the one or more programs can determine when two minutes have elapsed. Thus, after one minute, in an embodiment of the present invention, the one or more programs alert the receptionist that this customer is likely to be unhappy and recommends this customer be attended to immediately.

Embodiments of the present invention include a computer-implemented method, computer program product and system where a processor (or more than one processor) determines, based on obtaining data from one or more sensors over a wireless communications connection, that individuals are within a given vicinity. The processor queries, via the wireless communications connection, personal computing devices associated with the individuals within the given vicinity to determine an identity of each individual in the given vicinity. The processor assigns a service provider (or more than one service provider) to a portion of the identified individuals. The processor obtains, from computing resources accessible over the wireless communications connection, where the computing resources include the personal computing devices, preference information related to the portion of the identified individuals. The processor determines environmental information related to the environment experienced by the portion of the identified individuals, which includes locating at least one sensor of the one or more sensors, where the at least one sensor is within a predetermined distance of the portion of the identified individuals, and communicating, over the wireless communications connection, with the at least one sensor. The processor, based on the preference information and the environmental information, generates simulations for providing services to the portion of the identified individuals, where the simulations include temporal parameters for providing the services. The processor selects an optimal simulation. The processor communicates, via the wireless communications connection, instructions to achieve aspects of the optimal simulation to the service provider, where the communicating includes populating the instructions on a graphical user interface (or more than one graphical user interface) of a mobile computing device (or more than one mobile computing device) of the service provider, based on the temporal parameters.

In an embodiment of the present invention, the preference information includes an expected level of service, and generating simulations includes the processor determining, by executing a simulation, if the assigned service provider can serve the portion of the identified individuals at the expected level of service. Based on this determination, the processor updates the assigned service provider by retaining the assigned service provider or changing to a new one (or more) service provider.

In an embodiment of the present invention, the processor also assigns the service providers to a second portion of the identified individuals. The processor obtains, from personal computing devices of the second portion of identified individuals, preference information related to the second portion of the identified individuals. The processor determines environmental information related to an environment experienced by the second portion of the identified individuals by locating at least one sensor of the one or more sensors, where the at least one sensor is within a predetermined distance of the second portion of the identified individuals, and communicating, over the wireless communications connection, with the at least one sensor. Based on the preference information and the environmental information, the processor generates simulations for providing services to the second portion of the identified individuals, where the simulations include temporal parameters for providing the services. The processor selects a second optimal simulation. The processor communicates, via the wireless communications connection, additional instructions to achieve aspects of the second optimal simulation, to the service provider, which includes populating the additional instructions the graphical user interface of the mobile computing device of the one or more service provider, based on the temporal parameters.

In an embodiment of the present invention, the processor also optimizes a service schedule for the one or more service providers, which includes integrating the instructions and the additional instructions into the service schedule.

In an embodiment of the present invention, when the processor generates a simulation it applies a machine learning algorithm.

In an embodiment of the present invention, the processor also monitors the at least one sensor of the one or more sensors. The processor receives an indication of a change in environmental information and based on the change, updates the simulations. The processor re-generates the simulations and selects a new optimal simulation. The processor communicates, via the wireless communications connection, new instructions to achieve aspects of the new optimal simulation to the service provider, where the communicating includes replacing the instructions with the new instructions on the graphical user interfaces of the mobile computing device. In an embodiment of the present invention, the new instructions include a directive to take an immediate action.

In an embodiment of the present invention, the environmental information is selected from the group consisting of: time, temperature, humidity, vibrations, motion, light, pressure, and altitude.

In an embodiment of the present invention the processor also receives data, via the wireless communications connection, based on data entry through the graphical user interface of the mobile computing device. The processor updates the preference information based on the data.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the computing resource(s) 150 (FIG. 1), the mobile devices 190a-190b (FIG. 1) and the personal computing devices 160a-160d (FIG. 1) can be understood as cloud computing node 10 (FIG. 4) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
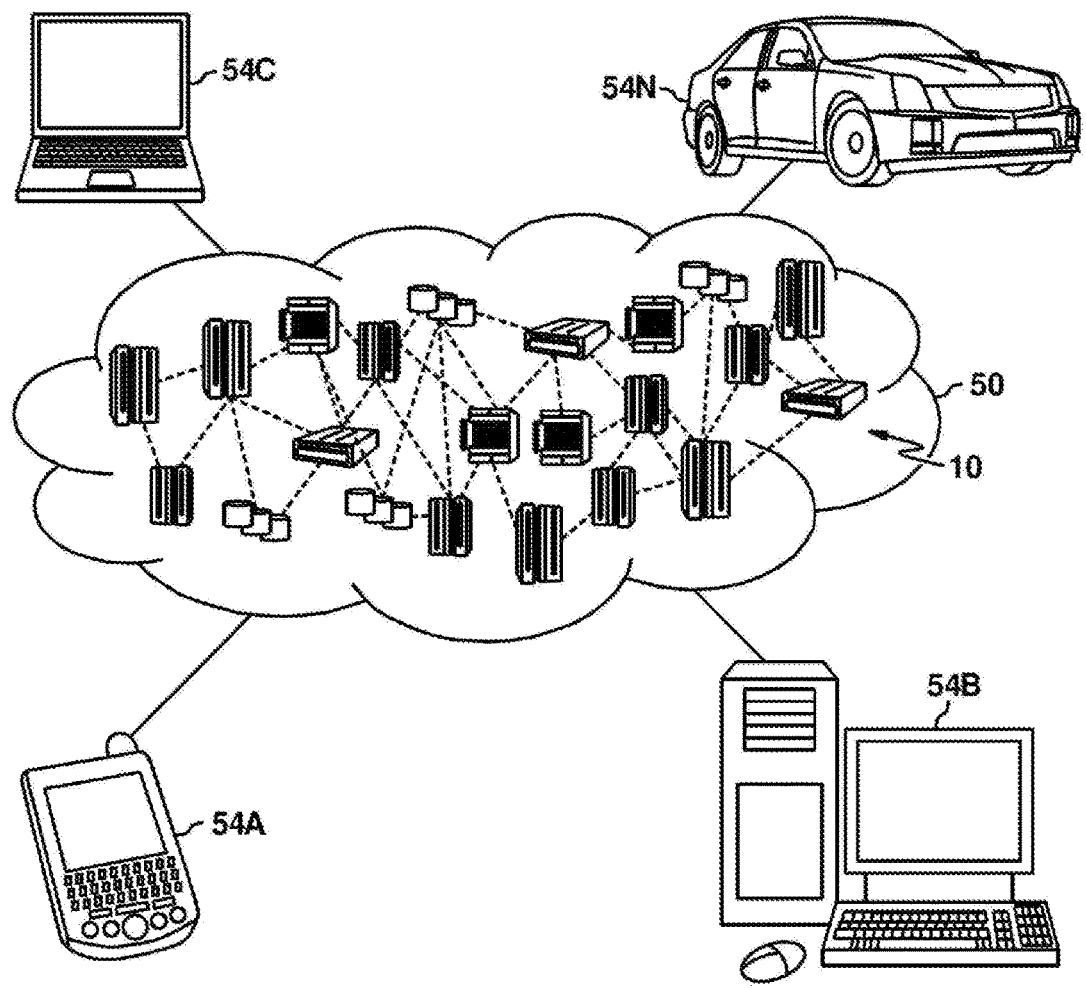
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
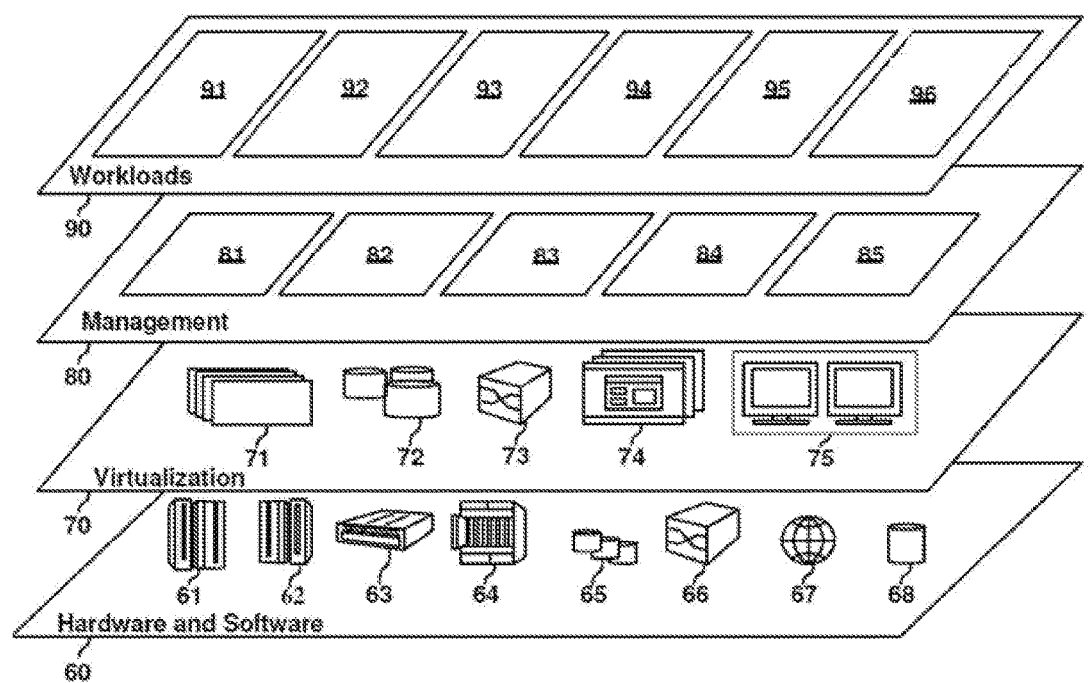
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating an optimized service pattern 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:

determining, by one or more processors, based on obtaining data from one or more sensors over a wireless communications connection, that individuals are within a given vicinity, based on communicating, over a wireless connection, for each individual or the individuals, with a device selected from the group consisting of: a computing device utilized by an individual and a static hardware sensor within the given vicinity of the individual;

querying, by one or more processors, via the wireless communications connection, personal computing devices associated with the individuals within the given vicinity to determine an identity of each individual in the given vicinity based on unique identifiers associated with the personal computing devices;

17 assigning, by the one or more processors, one or more service providers to a portion of the identified individuals;

obtaining, by the one or more processors, from computing resources accessible over the wireless communications connection, wherein the computing resources comprise the personal computing devices, preference information related to the portion of the identified individuals, wherein the preference information comprises an expected level of service;

determining, by the one or more processors, environmental information related to an environment experienced by the portion of the identified individuals, wherein the environmental information is selected from the group consisting of: time, temperature, humidity, vibrations, motion, light, pressure, and altitude, wherein the determining comprises locating at least one sensor of the one or more sensors, and wherein the at least one sensor is within a predetermined distance of the portion of the identified individuals, and communicating, over the wireless communications connection, with the at least one sensor;

based on the preference information and the environmental information, generating, by the one or more processors, simulations for providing services to the portion of the identified individuals, wherein the simulations comprise temporal parameters for providing the services, and wherein generating the simulations comprises:

determining, by the one or more processors, by executing a simulation, if the assigned one or more service providers can serve the portion of the identified individuals at the expected level of service;

based on the determining, updating, by the one or more processors, the assigned one or more service providers, wherein the updating is selected from the group consisting of: retaining the assigned one or more service providers and changing to a new one or more service providers; and applying, by the one or more processors, a machine learning algorithm;

selecting, by the one or more processors, an optimal simulation;

communicating, by the one or more processors, via the wireless communications connection, instructions to achieve aspects of the optimal simulation to the one or more service providers, wherein the communicating comprises populating the instructions on one or more graphical user interfaces of one or more mobile computing devices of the one or more service providers, based on the temporal parameters;

monitoring, by the one or more processors, the at least one sensor of the one or more sensors:

receiving, by the one or more processors, an indication of a change in environmental information; and based on the change, updating, by the one or more processor, the simulations;

re-generating, by the one or more processors, the simulations, based on the updating;

selecting, by the one or more processors, a new optimal simulation; and communicating, by the one or more processors, via the wireless communications connection, new instructions to achieve aspects of the new optimal simulation to the one or more service providers, wherein the communicating comprises replacing the instructions with the new instructions on the one or more graphical user interfaces of the one or more mobile computing devices, wherein the new instructions comprise a directive to take an immediate action.

2. The computer-implemented method of claim 1, further comprising:

assigning, by the one or more processors, the one or more service providers to a second portion of the identified individuals; and obtaining, by the one or more processors, from personal computing devices, preference information related to the second portion of the identified individuals;

determining, by the one or more processors, environmental information related to an environment experienced by the second portion of the identified individuals, wherein the determining comprises locating at least one sensor of the one or more sensors, wherein the at least one sensor is within a predetermined distance of the second portion of the identified individuals, and communicating, over the wireless communications connection, with the at least one sensor;

based on the preference information and the environmental information, generating, by the one or more processors, simulations for providing services to the second portion of the identified individuals, wherein the simulations comprise temporal parameters for providing the services;

selecting, by the one or more processors, a second optimal simulation; and communicating, by the one or more processors, via the wireless communications connection, additional instructions to achieve aspects of the second optimal simulation, to the one or more service providers, wherein the communicating comprises populating the additional instructions on the one or more graphical user interfaces of the one or more mobile computing devices of the one or more service providers, based on the temporal parameters.

3. The computer-implemented method of claim 2, further comprising:

optimizing, by the one or more processor, a service schedule for the one or more service providers, by the one or more processors, the optimizing comprising integrating the instructions and the additional instructions into the service schedule.

4. The computer-implemented method of claim 1, further comprising:

receiving, by the one or more processors, data, via the wireless communications connection, based on data entry through the one or more graphical user interfaces of the one or more mobile computing devices; and updating, by the one or more processors, the preference information based on the data.

5. A computer program product comprising:

a computer readable storage medium readable by one or more processors and storing instructions for execution by the one or more processors for performing a method comprising:

determining, by the one or more processors, based on obtaining data from one or more sensors over a wireless communications connection, that individuals are within a given vicinity, based on communicating, over a wireless connection, for each individual or the individuals, with a device selected from the group consisting of: a computing device utilized by an individual and a static hardware sensor within the given vicinity of the individual;

querying, by one or more processors, via the wireless communications connection, personal computing devices associated with the individuals within the given vicinity to determine an identity of each individual in the given vicinity based on unique identifiers associated with the personal computing devices;

assigning, by the one or more processors, one or more service providers to a portion of the identified individuals;

obtaining, by the one or more processors, from computing resources accessible over the wireless communications connection, wherein the computing resources comprise the personal computing devices, preference information related to the portion of the identified individuals, wherein the preference information comprises an expected level of service;

determining, by the one or more processors, environmental information related to an environment experienced by the portion of the identified individuals, wherein the environmental information is selected from the group consisting of: time, temperature, humidity, vibrations, motion, light, pressure, and altitude, wherein the determining comprises locating at least one sensor of the one or more sensors, and wherein the at least one sensor is within a predetermined distance of the portion of the identified individuals, and communicating, over the wireless communications connection, with the at least one sensor;

based on the preference information and the environmental information, generating, by the one or more processors, simulations for providing services to the portion of the identified individuals, wherein the simulations comprise temporal parameters for providing the services, and wherein generating the simulations comprises:

determining, by the one or more processors, by executing a simulation, if the assigned one or more service providers can serve the portion of the identified individuals at the expected level of service;

based on the determining, updating, by the one or more processors, the assigned one or more service providers, wherein the updating is selected from the group consisting of: retaining the assigned one or more service providers and changing to a new one or more service providers; and applying, by the one or more processors, a machine learning algorithm;

selecting, by the one or more processors, an optimal simulation;

communicating, by the one or more processors, via the wireless communications connection, instructions to achieve aspects of the optimal simulation to the one or more service providers, wherein the communicating comprises populating the instructions on one or more graphical user interfaces of one or more mobile computing devices of the one or more service providers, based on the temporal parameters;

monitoring, by the one or more processors, the at least one sensor of the one or more sensors;

receiving, by the one or more processors, an indication of a change in environmental information; and based on the change, updating, by the one or more processor, the simulations;

re-generating, by the one or more processors, the simulations, based on the updating;

selecting, by the one or more processors, a new optimal simulation; and communicating, by the one or more processors, via the wireless communications connection, new instructions to achieve aspects of the new optimal simulation to the one or more service providers, wherein the communicating comprises replacing the instructions with the new instructions on the one or more graphical user interfaces of the one or more mobile computing devices, wherein the new instructions comprise a directive to take an immediate action.

6. The computer program product of claim 5, the method further comprising:

assigning, by the one or more processors, the one or more service providers to a second portion of the identified individuals; and obtaining, by the one or more processors, from computing resources accessible over the wireless communications connection, wherein the computing resources comprise the personal computing devices, preference information related to the second portion of the identified individuals;

determining, by the one or more processors, environmental information related to an environment experienced by the second portion of the identified individuals, wherein the determining comprises locating at least one sensor of the one or more sensors, wherein the at least one sensor is within a predetermined distance of the second portion of the identified individuals, and communicating, over the wireless communications connection, with the at least one sensor;

based on the preference information and the environmental information, generating, by the one or more processors, simulations for providing services to the second portion of the identified individuals, wherein the simulations comprise temporal parameters for providing the services;

selecting, by the one or more processors, a second optimal simulation; and communicating, by the one or more processors, via the wireless communications connection, additional instructions to achieve aspects of the second optimal simulation, to the one or more service providers, wherein the communicating comprises populating the additional instructions on the one or more graphical user interfaces of the one or more mobile computing devices of the one or more service providers, based on the temporal parameters.

7. The computer program product of claim 6, the method further comprising:

optimizing, by the one or more processor, a service schedule for the one or more service providers, by the one or more processors, the optimizing comprising integrating the instructions and the additional instructions into the service schedule.

8. The computer program product of claim 5, the method further comprising:

receiving, by the one or more processors, data, via the wireless communications connection, based on data entry through the graphical user interface of the one or more mobile computing devices; and updating, by the one or more processors, the preference information based on the data.

9. A system comprising:

a memory;

one or more processors in communication with the memory;

one or more sensors in communication with the one or more processors over a wireless communications connection; and program instructions executable by the one or more processors via the memory to perform a method, the method comprising:

determining, by the one or more processors, based on obtaining data from the one or more sensors over the wireless communications connection, that individuals are within a given vicinity, based on communicating, over a wireless connection, for each individual or the individuals, with a device selected from the group consisting of: a computing device utilized by an individual and a static hardware sensor within the given vicinity of the individual;

querying, by one or more processors, via the wireless communications connection, personal computing devices associated with the individuals within the given vicinity to determine an identity of each individual in the given vicinity based on unique identifiers associated with the personal computing devices;

assigning, by the one or more processors, one or more service providers to a portion of the identified individuals;

obtaining, by the one or more processors, from computing resources accessible over the wireless communications connection, wherein the computing resources comprise the personal computing devices, preference information related to the portion of the identified individuals, wherein the preference information comprises an expected level of service;

determining, by the one or more processors, environmental information related to an environment experienced by the portion of the identified individuals, wherein the environmental information is selected from the group consisting of: time, temperature, humidity, vibrations, motion, light, pressure, and altitude, wherein the determining comprises locating at least one sensor of the one or more sensors, and wherein the at least one sensor is within a predetermined distance of the portion of the identified individuals, and communicating, over the wireless communications connection, with the at least one sensor;

based on the preference information and the environmental information, generating, by the one or more processors, simulations for providing services to the portion of the identified individuals, wherein the simulations comprise temporal parameters for providing the services, and wherein generating the simulations comprises:

determining, by the one or more processors, by executing a simulation, if the assigned one or more service providers can serve the portion of the identified individuals at the expected level of service;

based on the determining, updating, by the one or more processors, the assigned one or more service providers, wherein the updating is selected from the group consisting of: retaining the assigned one or more service providers and changing to a new one or more service providers; and applying, by the one or more processors, a machine learning algorithm;

selecting, by the one or more processors, an optimal simulation;

communicating, by the one or more processors, via the wireless communications connection, instructions to achieve aspects of the optimal simulation to the one or more service providers, wherein the communicating comprises populating the instructions on one or more graphical user interfaces of one or more mobile computing devices of the one or more service providers, based on the temporal parameters;

monitoring, by the one or more processors, the at least one sensor of the one or more sensors;

receiving, by the one or more processors, an indication of a change in environmental information; and based on the change, updating, by the one or more processor, the simulations;

re-generating, by the one or more processors, the simulations, based on the updating;

selecting, by the one or more processors, a new optimal simulation; and communicating, by the one or more processors, via the wireless communications connection, new instructions to achieve aspects of the new optimal simulation to the one or more service providers, wherein the communicating comprises replacing the instructions with the new instructions on the one or more graphical user interfaces of the one or more mobile computing devices, wherein the new instructions comprise a directive to take an immediate action.

* * * * *